United States Patent

Bunce et al.

[11] Patent Number: 5,901,729
[45] Date of Patent: May 11, 1999

[54] MATERIAL FLOW CONTROL ARRANGEMENT AND METHOD

[75] Inventors: Kevin Bunce, Höganäs, Sweden; Michael Stephen Daley, Wantage, United Kingdom

[73] Assignee: Elopak Systems AG, Glattbrugg, Switzerland

[21] Appl. No.: 08/839,676

[22] Filed: Apr. 15, 1997

[51] Int. Cl.[6] .................................................. F16K 11/02
[52] U.S. Cl. .................. 137/1; 137/614.13; 137/614.21; 137/238
[58] Field of Search .......................... 137/614.11, 614.13, 137/614.18, 614.14, 614.21, 1, 238

[56] References Cited

U.S. PATENT DOCUMENTS

| 1,495,166 | 5/1924 | Davis, Jr. et al. | 137/614.13 X |
| 2,102,571 | 12/1937 | Merwin et al. | 137/614.13 X |
| 5,421,358 | 6/1995 | Jaeger | 137/614.13 X |

Primary Examiner—Kevin Lee
Attorney, Agent, or Firm—Reising, Ethington, Learman & McCulloch, PLLC

[57] ABSTRACT

A dosing apparatus 1 includes a material flow control arrangement 2 including vertical ducting 4 having co-axial therewith a vertically reciprocatory rod 5 mounting at its ends inlet and outlet valve closure plugs 6a and 6b. The upper and lower end zones of the ducting 4 define respective circular-cylindrical inlet and outlet 13a and 13b bounded by respective circular-cylindrical valve seats 14a and 14b in which the plugs 6a and 6b are sliding fits. Mounted on at least one horizontal extension piece 4d of the ducting 4 is at least one dosing pump 16. When the outlet 13b is closed by the plug 6b, the cross-section of the inlet 13a is unobstructed; similarly, when the inlet 13a is closed by the plug 6a, the cross-section of the outlet 13b is unobstructed. Furthermore, in an intermediate position of the rod 5, the cross-sections of both the inlet 13a and the outlet 13b are unobstructed, so that passage of a cleaning fluid through the ducting 4 is facilitated.

16 Claims, 3 Drawing Sheets

MATERIAL FLOW CONTROL ARRANGEMENT AND METHOD

BACKGROUND OF THE INVENTION

1. Field of the Invention

This invention relates to an arrangement and a method for control of flow of material, particularly as applicable to an apparatus and a method for dosing the material.

2. Description of the Prior Art

U.S. Pat. No. 3,807,909 discloses a positive displacement pump for liquid or semi-liquid food products. The pump is controlled by a spool-type valve and includes a product dosing cylinder into which product is drawn and then expelled by a piston. A chamber is provided within a housing of the valve having an outlet in which is secured a nozzle having an internal chamber communicating with the remainder of the valve chamber. The nozzle chamber has upper and lower cylindrically shaped portions of given diameter separated by an intermediate section which tapers outwardly from both upper and lower portions to an expanded diameter portion at a level between the upper and lower portions. The valve spool has a lower plunger section reciprocating within the valve housing and nozzle chambers, and the plunger section has upper and lower portions matching in diameter and axial separation the respective upper and lower nozzle chamber portions. The intermediate portion of the plunger section tapers inwardly from both upper and lower plunger portions to a diameter smaller than the diameter of the upper and lower plunger portions. The piston and the spool are reciprocated in timed relationship so that, during a product intake stroke of the piston, the spool is in a lowermost position wherein both upper and lower plunger portions are positioned in sealed relationship with the upper and lower portions, respectively, of the nozzle chamber, and an upper plunger section of the valve spool is below a cylindrical inlet of the valve chamber of matching diameter while, during a discharge stroke of the piston, and when the valve spool is in its uppermost position, the upper plunger section seals in the cylindrical inlet and the upper plunger portion is positioned above the upper nozzle chamber portion, while the lower plunger portion is positioned just below the nozzle chamber upper portion, clear of the lower nozzle portion. The valve spool is initially moved upwardly from its lowermost position before the piston begins its product discharge stroke. A constricted annular opening is thereby defined through which product passes at an increased velocity to prevent air bubbles from rising upwardly in the outwardly moving product. The portion of the nozzle chamber below the lower plunger section of the valve spool provides an enlarged chamber when the valve spool is in the uppermost position, to reduce the velocity of the product as it is discharged from the nozzle into a container therebelow to minimize splashing. The valve spool includes a valve stem extending vertically from the lower plunger section to the upper plunger section and thence upwards towards a drive device. In the open condition of the inlet, its cross-section is obstructed by that valve stem and, in the open condition of the outlet, its cross-section is greatly obstructed by the lower plunger section.

WO88/06552 discloses a dosing system for filling containers with a particulate/liquid mixture and which includes three piston-and-cylinder devices, of which a first device delivers the mixture downwards to containers advanced beneath it, a second device feeds a thick particulate/liquid mixture via a conduit to the first device, and the third device feeds a thin liquid via a conduit to the first device. A liquid supply port is disposed peripherally in the cylinder of the first device, and a conduit in continuous communication with the port extends through the piston to a lower axial end of the piston. A thick mixture supply port is also disposed peripherally in the cylinder of the first device and is swept by the piston thereof. Each of the second and third devices comprises an inlet valve in the form of a rotary plug valve and a dosing piston-and-cylinder arrangement.

SUMMARY OF THE INVENTION

According to a first aspect of the present invention, there is provided a material flow control arrangement, comprising throughflow ducting, a flow inlet in said ducting, a flow outlet in said ducting, an inlet obturator arranged to obturate said flow inlet, an outlet obturator arranged to obturate said flow outlet, linking means interconnecting said inlet obturator and said outlet obturator, and driving means arranged to actuate said linking means to displace said inlet obturator and said outlet obturator between obturating and non-obturating positions, in the respective non-obturating positions of which the cross-sections of said inlet and said outlet are substantially unobstructed and such that, when said inlet obturator is in its said obturating position, said outlet obturator is in its said non-obturating position, and, when said outlet obturator is in its said obturating position, said inlet obturator is in its said non-obturating position.

According to a second aspect of the present invention, there is provided a material flow control method, comprising driving linking means into a first condition to displace an inlet obturator from an obturating position in which said inlet obturator obturates a flow inlet of throughflow ducting to a non-obturating position and to displace an outlet obturator from a non-obturating position to an obturating position in which said outlet obturator obturates a flow outlet of said ducting, leaving the cross-section of said inlet substantially unobstructed, except by said material, while said outlet obturator occupies its said obturating position, and subsequently driving said linking means into a second condition to return said outlet obturator from its said obturating position to its said non-obturating position and to return said inlet obturator from its said non-obturating position to its said obturating position, and leaving the cross-section of said outlet substantially unobstructed, except by said material, while said inlet obturator occupies its said obturating position.

Owing to the invention, it is possible to provide a material flow control arrangement which is suitable for controlling the flow of material comprised of relatively large pieces, for example chunks, such as of solid food, since the flow of the material through the inlet and the outlet in the non-obturating conditions of the respective obturators is substantially unobstructed. Moreover, a minimal amount of chopping of the solid pieces by the obturators during the opening and closing of the obturators can be obtained.

If the arrangement is used for dosing purposes, and/or if the amount of gas, such as air, in the material leaving the flow outlet is to be minimal, then the flow inlet is arranged at a higher level than the flow outlet, so that the gas can flow upwards to the inlet and leave the arrangement.

According to a third aspect of the present invention, there is provided material dosing apparatus, comprising:

a flow control arrangement comprising throughflow ducting, a flow inlet in said ducting, a flow outlet in said ducting, an inlet obturator arranged to obturate said flow inlet, an outlet obturator arranged to obturate said flow outlet, linking means interconnecting said inlet obturator and said outlet obturator, and driving means arranged to actuate said linking means to displace said inlet obturator and said outlet obturator between obturating and non-obturating positions, in the respective non-obturating positions of which the cross-sections of said inlet and said outlet are substantially unobstructed and such that, when said inlet obturator is in its said obturating position, said outlet obturator is in its said non-obturating position, and, when said outlet obturator is in its said obturating position, said inlet obturator is in its said non-obturating position, and a dosing device communicating with said ducting at a location intermediate said flow inlet and said flow outlet for dosing said material.

According to a fourth aspect of the present invention, there is provided a material dosing method, comprising driving linking means into a first condition to displace an inlet obturator from an obturating position in which said inlet obturator obturates a flow inlet of throughflow ducting to a non-obturating position and to displace an outlet obturator from a non-obturating position to an obturating position in which said outlet obturator obturates a flow outlet of said ducting, passing said material through said inlet into said ducting and thence into a dosing device while leaving the cross-section of said inlet substantially unobstructed, except by said material, and said outlet obturator occupies its said obturating position, and subsequently driving said linking means into a second condition to return said outlet obturator from its said obturating position to its said non-obturating position and to return said inlet obturator from its said non-obturating position to its said obturating position, and passing said material from said dosing device into said ducting and thence through said outlet while leaving the cross-section of said outlet substantially unobstructed, except by said material, and said inlet obturator occupies its said obturating position.

The dosing device may consist of a piston-and-cylinder device.

The linking means is preferably an elongate element, in the form of a stem, such as a rod or bar, attached at its ends to the respective obturators.

BRIEF DESCRIPTION OF THE DRAWINGS

In order that the invention may be clearly understood and readily carried into effect, reference will now be made, by way of example, to the accompanying drawings, in which.

DESCRIPTION OF THE PREFERRED EMBODIMENT(S)

Figure 1:
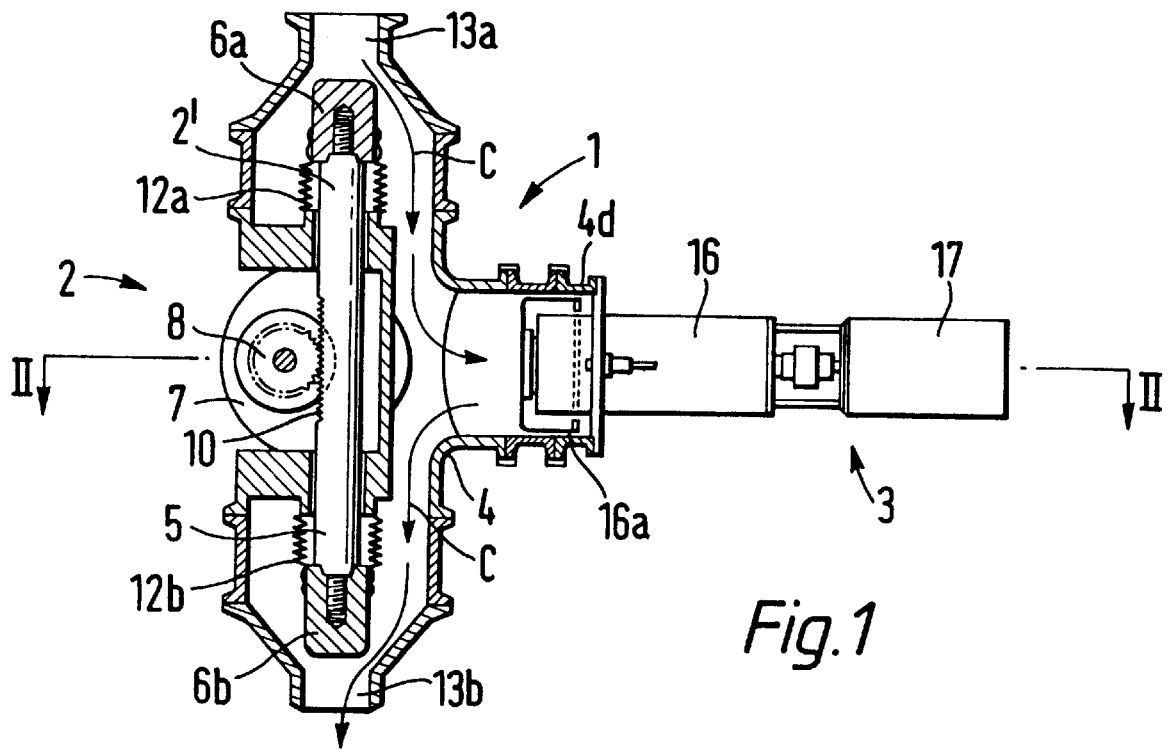
FIG. 1 is a vertical axial section through a dosing apparatus, with a valve device of a material flow control arrangement thereof in an intermediate condition of reciprocation.
Figure 2:
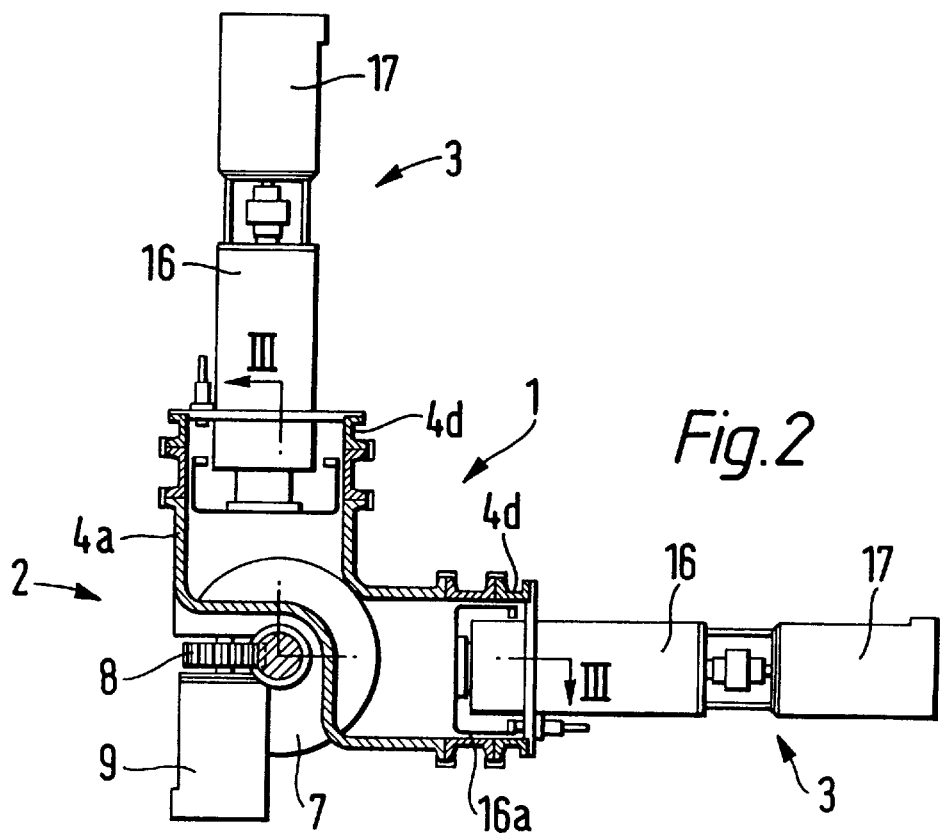
FIG. 2 is a horizontal section taken on the line II—II of FIG. 1.

Referring to the drawings, the dosing apparatus 1 comprises a material flow control arrangement 2 including a valve device 2, and two dosing devices 3. The arrangement 2 comprises throughflow ducting 4 comprised of a central piece 4a, two upper and lower, intermediate pieces 4b and two upper and lower, end pieces 4c of which the upper piece 4c is for connection to a product supply pipe (not shown) and of which the lower piece 4c constitutes an outlet nozzle for delivering doses of product onto a conveyor therebelow or into packaging containers therebelow to be filled with doses of the product. The ducting 4 has a vertical axis A and has co-axial therewith a vertically reciprocatory rod 5 mounting at its ends respective inlet and outlet obturators, in this case inlet valve and outlet valve closure members in the form of upper and lower, circular-cylindrical plugs 6a and 6b. Formed in the external surface of the central part 4a is a recess 7 which extends beyond the rod 5 and which receives a pinion 8 turnable about a horizontal axis by a motor 9 and engaging rack toothing 10 formed along the rod 5, so that the rod 5 may be reciprocated vertically by oscillation of the pinion 8. The rod 5 extends through upper and lower walls of the recess 7 into upper and lower chambers 11a and 11b sealed from the product flowing down through the ducting 4 by respective upper and lower concertina bellows 12a and 12b attached sealingly to the respective upper and lower closure members 6a and 6b and to the respective upper and lower walls of the recess 7. The upper end zone of the upper piece 4c defines a circular-cylindrical inlet port 13a bounded by a circular-cylindrical inlet valve seat 14a in which the plug 6a is a sliding fit. Similarly, the lower end zone of the lower piece 4c defines a circular-cylindrical outlet port 13b bounded by a circular-cylindrical outlet valve seat 14b in which the plug 6b is a sliding fit. The axes of the items 6a and 6b, 13a and 13b, and 14a and 14b coincide with the axis A. The central piece 4a has two horizontal, lateral ports 15 arranged at right-angles to each other and is provided with extension pieces 4d co-axial with the respective ports 15. Mounted co-axially on the extension pieces 4d are respective dosing pumps 16 reciprocated horizontally by respective motors 17. The pumps 16 include pistons in the form of rolling diaphragms or bellows 16a operating in cylinders constituted by the associated ports 15 and extension pieces 4d.

Figure 3:
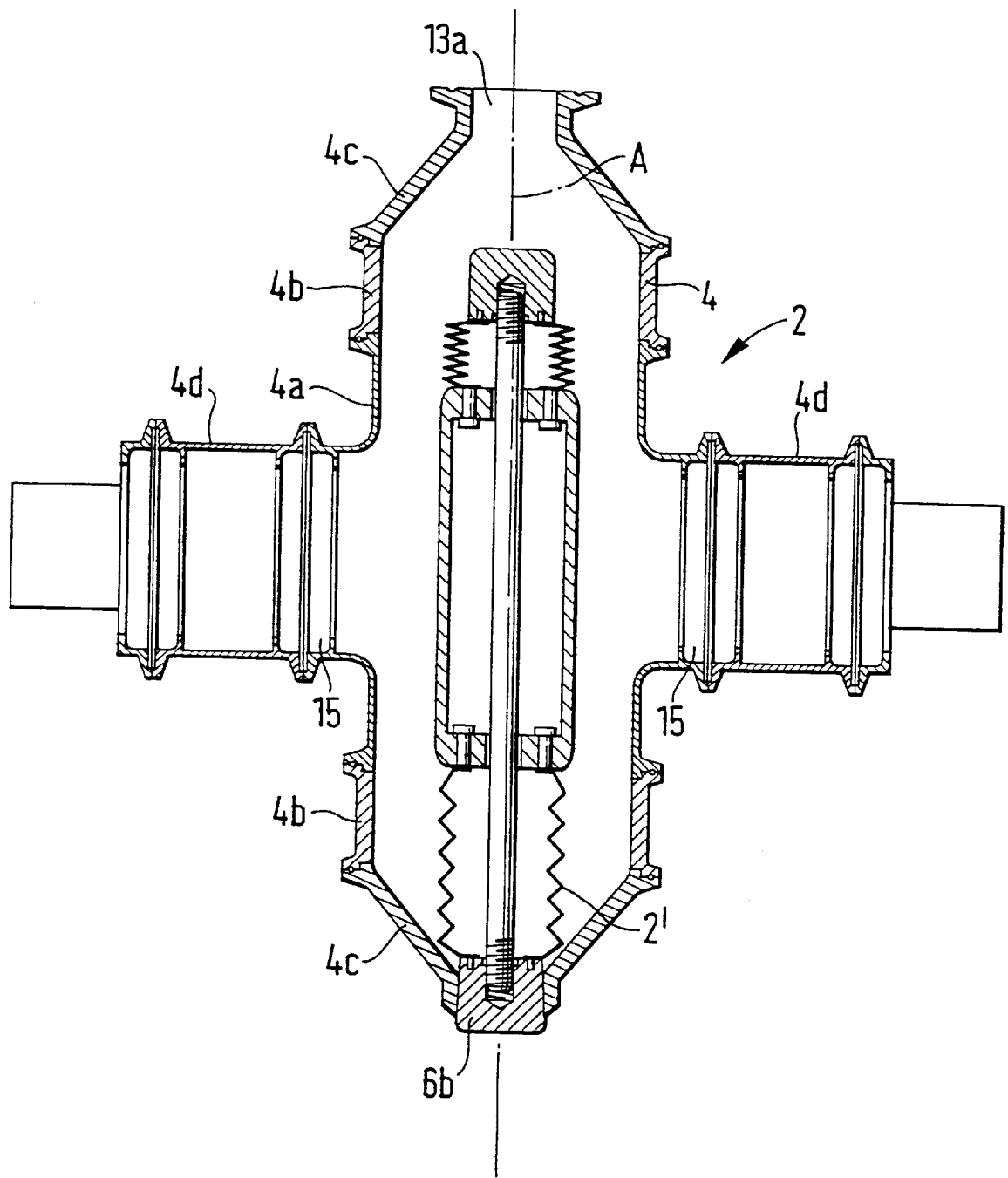
FIG. 3 shows an axial section taken on the lines III—III of FIG. 2 in planes at a right-angle to each other and with the valve device in a lowermost end condition.

The operation of the apparatus will now be described. The apparatus can be operated either with one of the dosing devices 3 operating and the other inoperative, or with both dosing devices 3 operating synchronously, in which latter case a dose doubled in volume can be delivered by the apparatus. Assume that the condition shown in FIG. 3 is one in which the apparatus has just delivered a dose through the port 13b, so that the valve closure member 6b is in its position sealing the port 13b and the pumping members 16a are in their innermost positions of stroke. Then one or both of the dosing devices 3 is operated to draw in a thus measured volume of product into the ducting 4. When the desired volume has been drawn in, the pinion 8 is turned to lift the rod 5 to open the outlet port 13b and close the inlet port 13a. For reasons to be explained concerned with facilitating cleaning of the ducting 4 and the parts 6 and 12 of the valve device, the outlet port 13b is opened before the inlet port 13a is closed, in other words the items 5, 6 and 12 pass through their intermediate position shown in FIG. 1. With the port 13a closed, one or both of the dosing devices 3 are operated to advance the pumping member(s) 16a inwards to expel product (which is of a consistency to tend not to flow from the ducting 4 under gravity) from within the ducting 4 (alternatively, in the event of a product which tends to remain to a very great extent within the ducting 4 and/or where filling of accurate doses is required, a non-return dispensing valve—not shown—may be connected downstream of the outlet port 13b). Following delivery of the dose to beneath the outlet port 13b, the pinion 18 is turned to lower the items 5, 6 and 12 back into the position shown in FIG. 3. In that position, the plug 6b may, as shown, project slightly beyond the acutely-edged lower extremity of the lower piece 4c to discourage dripping of product from the valve seat 14b. As an added discouragement of such dripping, the pinion 8 may be turned slightly to lift the items 5, 6 and 12 slightly from that position, to produce a suck-back effect of the plug 6b in the port 13b. The dosing cycle then recommences.

To speed up flushing of the apparatus with a cleaning fluid, for example steam, at the end of a working shift or during change-over from one product to another, the pinion 8 can be turned to bring the items 5, 6 and 12 into the position shown in FIG. 1, in which both ports 13a and 13b are open. The cleaning fluid is then passed through the apparatus as indicated by the arrows C. At the same time, one or both of the dosing devices 3 may be operated to promote the flushing effect, particularly in their pumping chambers bounded by the extensions 4d.

An advantage of the arrangement whereby the axis A is inclined to the horizontal, in particular vertical as shown, is that air or other gas in the product is thereby encouraged to rise to the inlet port 13a and leave the dosing apparatus.

Figure 4:
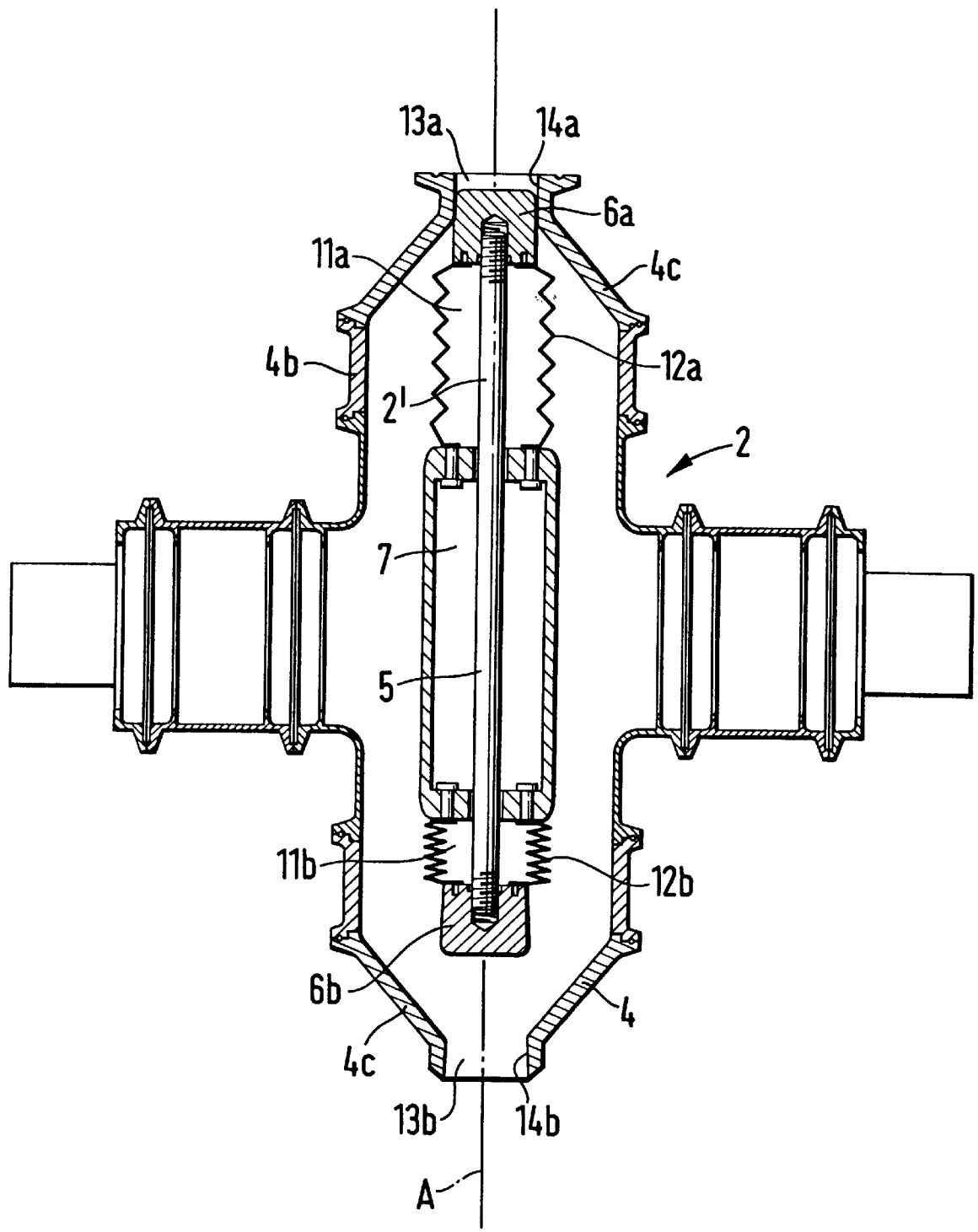
FIG. 4 is a view similar to FIG. 3, but with the valve device in an uppermost end condition.

The dosing apparatus is especially suitable for particulate products, with particle sizes up to even 45 to 50 mm. since the ports 13a and 13b, the extents of opening of the plugs 6a and 6b, the through-flow cross-section of the ducting 4, and the through-flow cross-sections of the ports 15 can be sufficiently large to give free passage to the product entering the apparatus in the FIG. 3 position and leaving the apparatus in the FIG. 4 position, so that the particles can pass through substantially undamaged. The concertina bellows 12a and 12b allow for motion of the items 5 and 6 without contamination of the product from the exterior through the recess 7.

We claim:

1. A material flow control arrangement, comprising throughflow ducting, a flow inlet in said ducting, a flow outlet in said ducting, an inlet obturator arranged to obturate said flow inlet, an outlet obturator arranged to obturate said flow outlet, linking means interconnecting said inlet obturator and said outlet obturator, and driving means arranged to actuate said linking means to displace said inlet obturator and said outlet obturator between obturating and non-obturating positions, in the respective non-obturating positions of which the cross-sections of said inlet and said outlet are substantially unobstructed and such that, when said inlet obturator is in said obturating position of said inlet obturator, said outlet obturator is in said non-obturating position of said outlet obturator, and, when said outlet obturator is in said obturating position of said outlet obturator, said inlet obturator is in said non-obturating position of said inlet obturator.

2. The arrangement according to claim 1, wherein said driving means serves to displace said inlet obturator and said outlet obturator through respective intermediate positions in which the cross-sections of both said inlet and said outlet are simultaneously substantially unobstructed.

3. The arrangement according to claim 1, wherein said linking means is an elongate element attached at its respective ends to said inlet obturator and said outlet obturator, said driving means is connected to said elongate element at a location intermediate the ends of said elongate element, said ducting includes an inlet seat and an outlet seat substantially encircling said flow inlet and said flow outlet, respectively, and said inlet obturator and said outlet obturator are arranged to co-operate substantially sealingly with said inlet seat and said outlet seat, respectively, to obturate flow through said inlet and said outlet.

4. The arrangement according to claim 3, wherein, of said elongate element, only an intermediate portion is outside said ducting and said location is outside said ducting.

5. The arrangement according to claim 4, and further comprising respective bellows connected sealingly between respective end portions of said elongate element and said ducting.

6. Material dosing apparatus, comprising:
   a flow control arrangement comprising throughflow ducting, a flow inlet in said ducting, a flow outlet in said ducting, an inlet obturator arranged to obturate said flow inlet, and outlet obturator arranged to obturate said flow outlet, linking means interconnecting said inlet obturator and said outlet obturator, and driving means arranged to actuate said linking means to displace said inlet obturator and said outlet obturator between obturating and non-obturating positions, in the respective non-obturating positions of which the cross-sections of said inlet and said outlet are substantially unobstructed and such that, when said inlet obturator is in said obturating position of said inlet obturator, said outlet obturator is in said non-obturating position of said outlet obturator, and, when said outlet obturator is in said obturating position of said outlet obturator, said inlet obturator is in said non-obturating position of said inlet obturator, and
   a dosing device communicating with said ducting at a location intermediate said flow inlet and said flow outlet for dosing said material.

7. Apparatus according to claim 6, wherein said driving means serves to displace said inlet obturator and said outlet obturator through respective intermediate positions in which the cross-sections of both said inlet and said outlet are simultaneously substantially unobstructed.

8. Apparatus according to claim 6, wherein said linking means is an elongate element attached at its respective ends to said inlet obturator and said outlet obturator, said driving means is connected to said elongate element at a location intermediate the ends of said elongate element, said ducting includes an inlet seat and an outlet seat substantially encircling said flow inlet and said flow outlet, respectively, and said inlet obturator and said outlet obturator are arranged to co-operate substantially sealingly with said inlet seat and said outlet seat, respectively, to obturate flow through said inlet and said outlet.

9. Apparatus according to claim 8, wherein, of said elongate element, only an intermediate portion is outside said ducting and said location is outside said ducting.

10. Apparatus according to claim 9, and further comprising respective bellows connected sealingly between respective end portions of said elongate element and said ducting.

11. A material flow control method, comprising driving linking means into a first condition to displace an inlet obturator from an obturating position in which said inlet obturator obturates a flow inlet of throughflow ducting to a non-obturating position and to displace an outlet obturator from a non-obturating position to an obturating position in which said outlet obturator obturates a flow outlet of said ducting, leaving the cross-section of said inlet substantially unobstructed, except by said material, while said outlet obturator occupies said obturating position of said outlet obturator, and subsequently driving said linking means into a second condition to return said outlet obturator from said obturating position of said outlet obturator to said non-obturating position of said outlet obturator and to return said inlet obturator from said non-obturating position of said inlet obturator to said obturating position of said inlet obturator, and leaving the cross-section of said outlet substantially unobstructed, except by said material, while said inlet obturator occupies said obturating position of said inlet obturator.

12. A method according to claim 11, and further comprising subsequently driving said linking means into a third condition in which both said inlet obturator and said outlet obturator are in respective non-obturating conditions, and passing a cleaning fluid through said ducting while the obturators are in said non-obturating conditions.

13. The method according to claim 11, wherein said material comprises relatively large, solid pieces.

14. A material dosing method, comprising driving linking means into a first condition to displace an inlet obturator from an obturating position in which said inlet obturator obturates a flow inlet of throughflow ducting to a non-obturating position and to displace an outlet obturator from a non-obturating position to an obturating position in which said outlet obturator obturates a flow outlet of said ducting, passing said material through said inlet into said ducting and thence into a dosing device while leaving the cross-section of said inlet substantially unobstructed, except by said material, and said outlet obturator occupies said obturating position of said outlet obturator, and subsequently driving said linking means into a second condition to return said outlet obturator from said obturating position of said outlet obturator to said non-obturating position of said outlet obturator and to return said inlet obturator from said non-obturating position of said inlet obturator to said obturating position of said inlet obturator, and passing said material from said dosing device into said ducting and thence through said outlet while leaving the cross-section of said outlet substantially unobstructed, except by said material, and said inlet obturator occupies said obturating position of said inlet obturator.

15. The method according to claim 14, and further comprising subsequently driving said linking means into a third condition in which both said inlet obturator and said outlet obturator are in respective non-obturating conditions, and passing a cleaning fluid through said ducting while the obturators are in said non-obturating conditions.

16. The method according to claim 14, wherein said material comprises relatively large, solid pieces.

* * * * *